(12) United States Patent
Grose (10) Patent No.: US 12,319,193 B2
(45) Date of Patent: Jun. 3, 2025

(54) BRINE DENSITY APPARATUSES AND METHODS

(71) Applicant: Dean Grose, Eighty Four, PA (US)

(72) Inventor: Dean Grose, Eighty Four, PA (US)

( * ) Notice: Subject to any disclaimer, the term of this patent is extended or adjusted under 35 U.S.C. 154(b) by 35 days.

(21) Appl. No.: 18/537,731

(22) Filed: Dec. 12, 2023

(65) Prior Publication Data

US 2024/0109005 A1 Apr. 4, 2024

Related U.S. Application Data

(63) Continuation-in-part of application No. 17/506,970, filed on Oct. 21, 2021, and a continuation-in-part of application No. 17/410,560, filed on Aug. 24, 2021, and a continuation-in-part of application No. 17/091,800, filed on Nov. 6, 2020, now Pat. No. 11,613,458, which is a continuation-in-part of application No. 17/024,673, filed on Sep. 17, 2020, now Pat. No. 11,725,972, application No. 18/537,731 is a continuation-in-part of application No. 17/024,673, filed on Sep. 17, 2020, now Pat. No. 11,725,972.

(60) Provisional application No. 63/034,945, filed on Jun. 4, 2020, provisional application No. 63/022,351, filed on May 8, 2020, provisional application No. 62/978,015, filed on Feb. 18, 2020.

(51) Int. Cl.
*B60P 3/22* (2006.01)
*B01D 21/00* (2006.01)
*B01D 21/30* (2006.01)
*E21B 43/26* (2006.01)
*G01N 9/36* (2006.01)
*B01F 101/49* (2022.01)

(52) U.S. Cl.
CPC ........ *B60P 3/2245* (2013.01); *B01D 21/0012* (2013.01); *B01D 21/302* (2013.01); *B60P 3/228* (2013.01); *E21B 43/2607* (2020.05); *G01N 9/36* (2013.01); *B01F 2101/49* (2022.01)

(58) Field of Classification Search
CPC .... B60P 3/2245; B60P 3/228; B01D 21/0012; B01D 21/302; B01F 2101/49; E21B 43/2607; G01N 9/36
See application file for complete search history.

(56) References Cited

U.S. PATENT DOCUMENTS

| | | | | |
|---|---|---|---|---|
| 9,341,058 B2* | 5/2016 | Keizer | ............... | C02F 1/008 |
| 10,759,985 B2* | 9/2020 | Liu | ............... | C09K 8/05 |
| 11,034,605 B2* | 6/2021 | Katz | ............... | B01D 3/007 |
| 11,320,079 B2* | 5/2022 | Kuhn De Chizelle | | ............... E21B 43/2607 |

(Continued)

FOREIGN PATENT DOCUMENTS

JP 2018519154 A * 7/2018 ............... B01F 5/10

OTHER PUBLICATIONS

"Schenker diverter valve with salinity and conductivity probe 12V", https://www.manelservice.com/en/mare/15279-schenker-diverter-valve-with-salinity-and-conductivity-probe.html, accessed Dec. 12, 2023.

*Primary Examiner* — Nicolas A Arnett
(74) *Attorney, Agent, or Firm* — Richard W. James (57) ABSTRACT

A brine separation system based on density. The system senses brine density and directs brine having a low density to a standard brine storage area and brine having a high density to a heavy brine storage area using a sensor and valves coupled to a processor-based controller.

20 Claims, 5 Drawing Sheets

(56) References Cited

U.S. PATENT DOCUMENTS

| | | | |
|---|---|---|---|
| 11,598,189 B2* | 3/2023 | George | F04F 13/00 |
| 11,796,437 B2* | 10/2023 | Hildreth | G01N 9/00 |
| 12,196,077 B2* | 1/2025 | El Mallawany | G01N 9/14 |
| 2007/0262029 A1* | 11/2007 | Yoshida | B01D 61/025 |
| | | | 700/282 |
| 2010/0059226 A1* | 3/2010 | Termine | E21B 43/16 |
| | | | 166/308.1 |
| 2019/0161667 A1* | 5/2019 | Chiasson | E21B 36/003 |
| 2021/0252431 A1* | 8/2021 | Malone | B01D 21/34 |
| 2024/0035372 A1* | 2/2024 | El Mallawany | E21B 47/12 |

* cited by examiner

BRINE DENSITY APPARATUSES AND METHODS

CROSS-REFERENCE TO RELATED APPLICATIONS

The present application is a continuation-in-part of U.S. Utility patent application Ser. No. 17/091,800, filed Nov. 6, 2020, which claims priority to U.S. Provisional Patent Application No. 62/978,015, filed Feb. 18, 2020, and which claims priority to U.S. Provisional Patent Application No. 63/034,945, filed Jun. 4, 2020, and which is a continuation-in-part of U.S. Utility patent application Ser. No. 17/024,673, filed Sep. 17, 2020, which claims priority to U.S. Provisional Patent Application No. 63/022,351, filed May 8, 2020. The present application is also a continuation-in-part of the aforementioned U.S. Utility patent application Ser. No. 17/024,673, filed Sep. 17, 2020, U.S. Utility patent application Ser. No. 17/410,560, filed Aug. 24, 2021, and U.S. Utility patent application Ser. No. 17/506,970, filed Oct. 21, 2021. All of the aforementioned applications are incorporated herein in their entireties.

BACKGROUND

Field of the Disclosure

The present disclosure relates generally to detection of density of industrial water admixtures, sometimes referred to as brine. For example, water admixtures such as those used in oil and gas drilling shale hydraulic fracturing.

Description of the Related Art

Industrial processes, including oil and natural gas production, often use process water that includes sand, salts, acids, oils, and a variety of chemical additives. Such additives may, for example, lubricate or contribute to lubricity, permitting the process water to slide into spaces where pure water may not penetrate, may have a desirable pH, for example to reduce corrosion, or may have other desirable characteristics. Moreover, when such process water is removed from a process, the process water may additionally include a variety of additional constituent materials, including oils and hydrocarbons, materials used in the processes, particles, cuttings, sludge, pipe dope, and earth and stone fragments that are carried out in addition to constituent materials placed in the process water. That removed process water, which includes those and possibly other of various constituent components, may be referred to as brine or invert, particularly in oil and gas field vernacular.

Density is a measure of mass per volume. Various parameters, including the mass, volume, turbidity, or other measurable physical characteristic that measures or indicates a quantity or an amount of non-aqueous constituent components within a volume of process water may, however, be used as a measurement that may be referred to as brine density. Higher and lower density brines have separate uses in certain industrial processes. For example, low-density brines may be preferable when fracturing is occurring in a shale formation for an oil or gas extraction operation, and high-density brines may be preferable when winterizing or closing such a fracking site.

Accordingly, there is a need to measure the amount of non-water constituent components in process water flowing into a tank, facility, site, or other location.

There is also a need to measure the brine density of brine being unloaded at an operations facility or site.

There is also a need to direct brines above a predetermined density to a particular tank or location and to direct brines below that or another predetermined density to a different tank or locations.

There is also a need to provide a warning when brine is of a density other than the desired density.

Accordingly, the present invention provides solutions to the current shortcomings of handling process water mixtures, such as brine. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

SUMMARY OF THE INVENTION

In an embodiment, a brine density system for an aqueous admixture includes a processor-based controller having an input and a plurality of outputs. In that brine density system a brine density sensor is coupled to a first input of the controller, the brine density sensor sensing an amount of non-aqueous constituent components within the aqueous mixture and providing a signal to the controller commensurate with that amount of non-aqueous constituent components within in the aqueous mixture. A standard brine valve is installed in a standard brine line that leads to a standard brine tank. That standard brine valve has an actuator controlled from a first output of the controller such that the standard brine valve is open when the brine density sensor senses brine having a density less than a first predetermined level and the standard brine valve is closed when the brine density sensor senses brine having a density greater than a second predetermined level. A heavy brine valve in a heavy brine line that leads to a heavy brine tank, the heavy brine valve having an actuator controlled from a second output of the controller or an inverted signal from the first output such that the heavy brine valve is open when the brine density sensor senses brine having a density greater than the second predetermined level and the heavy brine valve is closed when the brine density sensor senses brine having a density less than the first predetermined level.

In another embodiment, a brine density system includes an inlet coupled to a conduit to receive brine flow from a tanker truck tank and adapted to be coupled to a first end of a tanker truck transfer hose, a brine density sensor in a brine density system conduit. In that embodiment, the brine density sensor senses a measurable physical characteristic that indicates an amount of non-aqueous constituent components within a volume of process water. That embodiment further includes at least one valve in the brine density system conduit that directs brine flowing through the brine density system to either a standard brine tank or a heavy brine tank. The brine is directed to the standard brine tank if the sensed physical characteristic indicates the brine flowing from the tanker truck tank is below a predetermined level and the brine is directed to the heavy brine tank if the sensed physical characteristic indicates the brine flowing from the tanker truck tank is above the predetermined level.

A method of separating brines to be used in different hydraulic fracturing tasks includes a controller receiving a signal related to the density of non-aqueous constituent components in an aqueous admixture for use on a hydraulic fracturing site fluorometer and directing low density aqueous mixture for use in hydraulic fracturing to a first storage area and high density aqueous mixture for use in tasks other than hydraulic fracturing, including well closing and well winterizing, to a second storage area.

Other embodiments, which may include one or more portions of the aforementioned apparatuses and methods or other parts or elements, are also contemplated, and may have a broader or different scope than the aforementioned apparatuses and methods. Thus, the embodiments in this Summary of the Invention are mere examples, and are not intended to limit or define the scope of the invention or claims.

DETAILED DESCRIPTION

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 1:
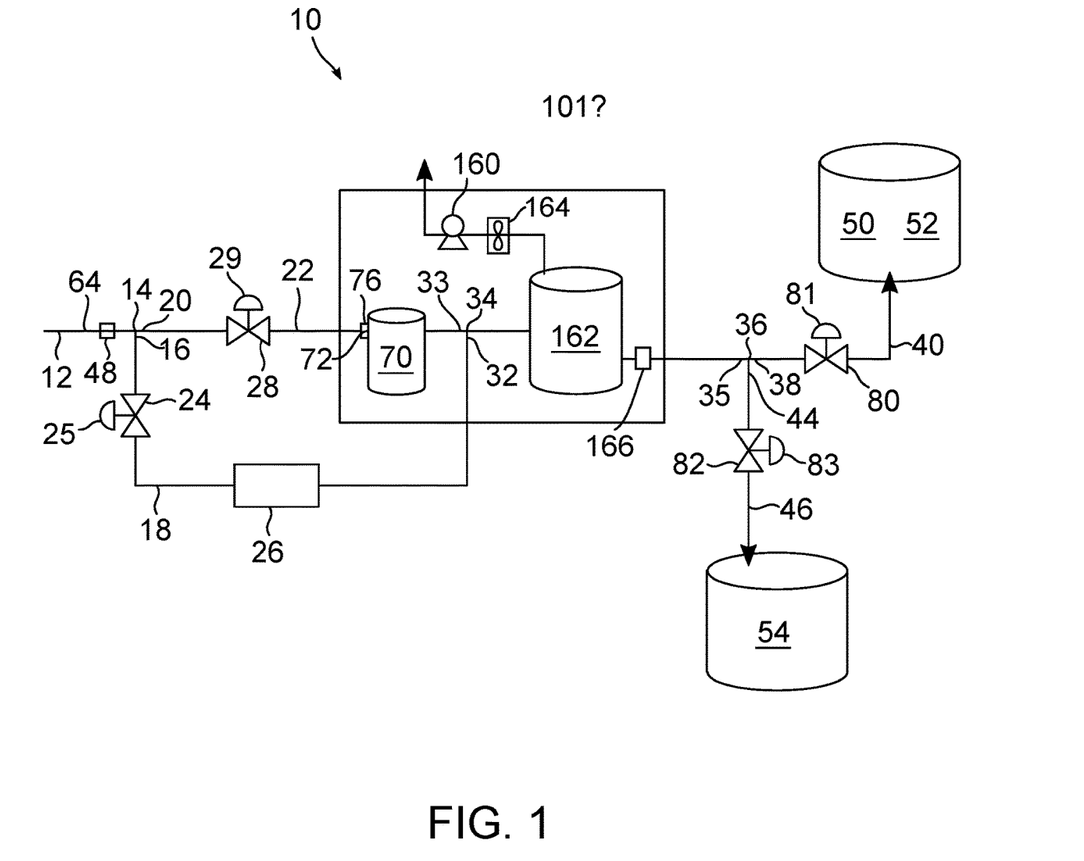
FIG. 1 illustrates an embodiment of a brine density system.

FIG. 1 illustrates an embodiment of a brine density system 10. The brine density system 10 of FIG. 1 senses the amount of non-water elements, components, compounds, or constituents contained in an aqueous solution referred to as brine herein, flowing in a transfer line of a brine density system 10 and directs that brine to an appropriate location. For example, brine effluent having density less than a first predetermined brine density may be directed to a standard use brine tank 50 or an above-ground storage tank (AST) 52, while brine having a density greater than that first or a different second predetermined density may be directed and delivered to a heavy brine tank 54.

The brine density system 10 may include an inlet 12 with a connector 13 to which a transfer hose 64 or other conduit may be connected to permit brine to flow into the brine density system 10. Brine flow may, alternatively, be directed into the brine density system 10 otherwise, as desired. It will be recognized that brine may be fed into the brine density system 10 through the transfer hose 64 from a tank 212 on a tanker truck 210, by a pipe in fluid-communication with a free-standing tank, or otherwise as desired.

The brine density system 10 inlet 12 may be coupled to the inlet 15 of an initial diverting wye 14 having two outlets, the first outlet 16 leading to a brine sensing branch 18 and the second outlet 20 leading to a sediment deposition branch 22. The brine sensing branch 18 may include a sensing valve 24 and a brine density sensor 26. The sediment deposition branch 22 may include a brine flow valve 28 and lead to a heavy sediment settling tank 70. Each of the sensing valve 24 and the brine flow valve 28 may include an actuator to open, close, or modulate those valves 24, 28 and that actuator may be operated manually or through a control system, such as the processor-based device 600 illustrated in FIG. 4. Either or both of those valves 24, 28 may be opened to permit brine to flow through that valve 24, 28 to put one or more portions of the downstream brine density system 10 into operation. One or both of those valves may be closed to prevent flow through one or both of the valves 24, 28 to isolate one or more portions of the brine density system 10 or other downstream systems or to stop brine flow.

The sensing valve 24 and the brine flow valve 28 may be a variety of types of valves, including a ball valve, a gate valve, or a globe valve. The valves 24, 28 may be actuated manually or may be automatically modulated or controlled for full opening or closure by a control system, such as the processor-based device 600 illustrated in FIG. 4. The brine flow valve 28 may be of a size that permits full flow of fluid from a truck 210 tank 212, for example, such as a 4" valve with a full flow characteristic. The full flow characteristic of a ball valve, for example, may be beneficial to enable fast offloading of tanks 12 coupled to the brine density system 10. Alternatively, the brine flow valve 28 may be configured with a linear control characteristic, such as that provided by a globe valve, or may have another desired flow characteristic. The sensing valve 24 may be a smaller valve than the brine flow valve 28 and may be modulated or fully opened to permit an appropriate flow of brine for sensing of brine density by the brine density sensor 26.

Brine flowing from the brine sensing branch 18 may flow into a first inlet 32 of a mixing wye 34 and brine flowing from the sediment deposition branch 22 may flow into a second inlet 33 of the mixing wye 34.

The mixing wye 34 may direct brine flowing from the brine sensing branch 18 and brine flowing from the sediment deposition branch 22 into a vacuum system and an air removal system 160. The air removal system 160 may include an intermediate tank 162 and a blower 164 and the blower 164 or another apparatus may create a vacuum in the intermediate tank 162. That vacuum may furthermore draw brine from the inlet 12 of the brine density system 10, through one or both of the brine sensing branch 18 and the sediment deposition branch 22. That vacuum may be in the range of 12-15 inches of mercury and may speed the flow of brine from its source, for example a tanker truck 210 tank 212, into the brine sensing system 10.

Brine exiting the intermediate tank 162 may enter an inlet 35 of a brine density diverting wye 36. A standard brine outlet 38 of the brine density diverting wye 36 may have a standard brine pipe 40 or other line connected thereto, which is directed to the standard brine storage tank 50, which may be an AST 52. A heavy brine outlet 44 of the brine diverting wye 36 may have a heavy brine pipe 46 or other line directed to the heavy brine storage tank 54.

The standard brine pipe 40 may include a standard brine valve 80 that may be opened to allow low-density brine entering or flowing into the brine density system 10 to flow into the standard brine storage tank 50. The standard brine valve 80 may be closed to prevent flow of high-density brine entering or flowing through the brine density system 10 from flowing into the standard brine storage tank 50. Thus, the standard brine valve 80 may be opened when brine, determined to be below the first predetermined level of brine density at the brine density sensor 26, is flowing through the brine density system 10 to permit that brine to flow into the standard brine storage tank 50 or AST 52 through the standard brine valve 80. The standard brine valve 80 may be closed when brine determined to be above the first or the second predetermined level of brine density at the brine density sensor 26 is flowing through the brine density system 10 to prevent high-density brine from entering the standard brine tank 50 or AST 52.

A heavy brine valve 82 may be located in the heavy brine pipe 46. The heavy brine valve 82 may be opened to direct high-density brine entering or flowing through the brine density system 10 to flow into the heavy brine storage tank 54 and the heavy brine valve 82 may be closed to prevent low-density brine entering or flowing through the brine density system 10 from entering the heavy brine storage tank 54. Thus, the heavy brine valve 82 may, for example, be opened when brine determined to be above the first predetermined density level or the second predetermined density level at the brine density sensor 26 is flowing through the brine density system 10 to permit that brine to flow into the heavy brine storage tank 54 and the heavy brine valve 82 may be closed when brine determined to be below the first predetermined level of brine density or another desired level of brine density at the brine density sensor 26 is flowing through the brine density system 10 to prevent that low-density brine from entering the heavy brine density tank 54.

It should be recognized that a single three-way valve may be used in place of the standard brine valve 80 and the heavy brine valve 82. Similarly, a single three-way valve may be used in place of the sensing branch valve 24 and the brine flow valve 28.

It should also be recognized that a hysteresis may be used to open the standard brine valve 70 at the first predetermined brine density level and a different, second, predetermined brine density level may be used to close the standard brine valve 70. Similarly, a hysteresis may be used to open the heavy brine valve 72 at the second predetermined brine density level and the first predetermined brine density level may be used for closing the heavy brine valve 72.

Figure 4:
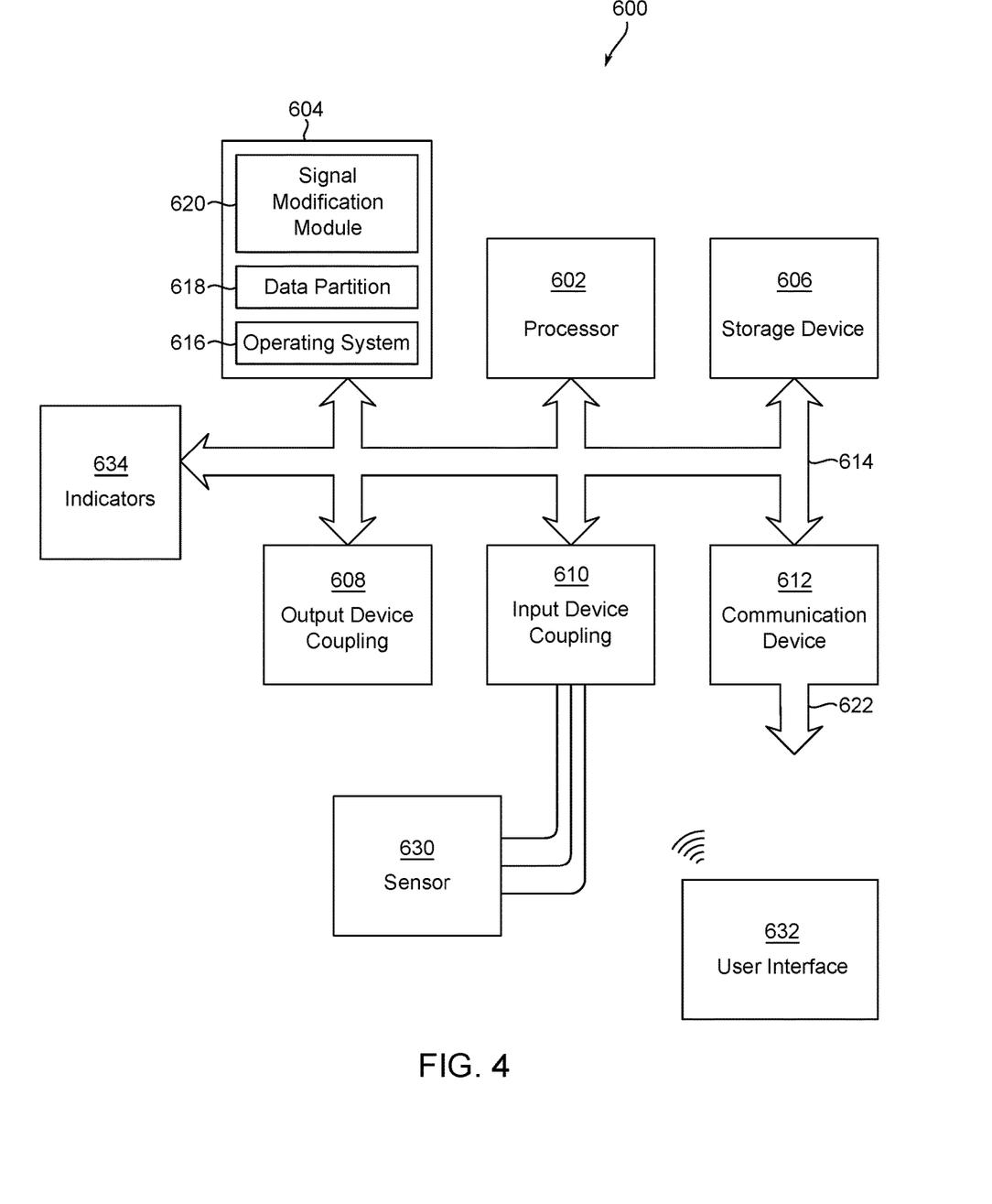
FIG. 4 illustrates an embodiment of a processor-based controller for use in a brine density system.

In an embodiment, the standard brine valve 80 and the heavy brine valve 82 each have actuators that are controlled by one or separate outputs of a processor-based control device, such as the controller 600 illustrated in FIG. 4.

Standard use brine directed to the standard use brine tank 50 or AST 52 and heavy brine destined for the heavy brine tank 54 may both be directed through the air removal system 160 to remove air in the brine and minimize pumping or other problems associated with having air mixed with fluid. After the brine passes through the air removal system 160, brine may be diverted into the standard brine tank 50 or AST 52 through the standard brine valve 80, or directed to the heavy brine tank 54 through the heavy brine valve 82.

The air removal system 160 of the brine density system 10 may include the heavy sediment settling tank 70. The heavy sediment settling tank 70 may be included in brine density system 10 and not in other brine density system 10. For example, where brine of a certain density is to be prepared at a brine creation facility and unloaded into the brine density system 10, it may be expected that there will be little heavy sediment. Accordingly, in such a brine density system 10 to receive such newly prepared brine, a heavy sediment settling tank 70 may be unnecessary and may or may not be included in the brine density system 10. In circumstances where brine is being delivered to the brine density system 10 from other locations, the brine density system 10 may beneficially includes a heavy brine settling tank 70 for removing and one or more strainers or filters 76 for collecting the heavy sediment unloaded into the brine density system 10.

When brine passes into the heavy sediment settling tank 70 through the settling tank inlet 72, heavy elements, such as stones and other undissolved solids, may drop into the settling tank 70, while brine, which may be an aqueous solution that includes water and dissolved or suspended elements mixed with the water, may pass through the settling tank 70 and flow out of the settling tank outlet 74 toward a receiving tank 50, 54. In an embodiment, the strainer or filter 76, such as, for example, a fabric screen or a permeable metal container, may be positioned in or near the settling tank 70 to capture heavy sediment flowing toward or into the settling tank 70. That strainer or filter 76 may, for example, be positioned at or near the inlet 72 of the settling tank 70 to capture debris as it enters the settling tank 70. That filter 76 may further be removable, so that, for example, debris unloaded from every tank 212 of every tanker truck 210 that unloads into the brine density system 10 may be measured. Alternatively, debris in that filter 76 may be captured and sediment may be held in the filter 76 in-situ until the filter 76 is removed or emptied at a desired time. An amount of debris that enters the brine density system 10 periodically, such as during the unloading of a single or series of tanker trucks 210 from a particular site, may be recorded, for example, by having a debris sensor 48 provide a signal to a processor-based control device, such as the controller 600 illustrated in FIG. 4, or a microprocessor that may be packaged with the sensor measuring the debris as a unit.

Use of the strainer or filter 76 to collect heavy elements in brine being unloaded into the brine density system 10 may be used to reduced end of frac cleaning costs for an operator because debris is prevented from entering the standard use brine tank 50, the above-ground storage tank (AST) 52, and the heavy brine tank 54. Measuring heavy elements entering the brine density system 10 from a tanker truck 210 tank 212 may also alter tanker truck 210 driver behavior. If, for example, the driver is instructed to minimize heavy elements in a tank 212 of brine and the amount of heavy elements discharged by that tanker truck 210 is related to the driver, that driver may be more conscientious about minimizing heavy element intake into the tank 212 in the future.

Debris may be measured by weight, by a scale for example, by volume, in a container for example, or an amount of debris unloaded into the brine density system 10 may otherwise be measured. That amount of measured debris entering the brine density system 10 may furthermore be logged on a paper log or sensed electronically by the debris sensor 48 to maintain a record of, for example, which site large quantities of debris are being hauled from or which haulers are hauling in large quantities of debris, or simply to be aware of the amount of debris being unloaded by a brine hauling operator.

Brine passing through the brine sensing branch 18 may pass though the brine density sensor 26, which may be one or more of a variety of sensors that measure one or more characteristics commensurate with brine density. Such brine density sensors 26 may include, for example, a density sensor, a mass sensor, a volume sensor, a salinity sensor, a turbidity sensor, or another sensor that measures one or more physical characteristics of the brine and that indicates a quantity of or an amount of non-aqueous constituent components contained within a volume of process water being loaded into the brine density system 10. In an embodiment of the brine density system 10, for example, a Coriolis meter may be included as a brine density sensor 26 in the brine sensing branch 18 to measure the density of fluid passing through the brine sensing branch 18, and may simultaneously measure mass flow rate, temperature, volumetric flow rate, or concentration of brine passing through the brine sensing branch 18. A Coriolis meter may measure density directly from the frequency of oscillation of the flow tubes inside the Coriolis meter. Accordingly, density may not need to be computed from other measurements such as mass, volume, salinity, or turbidity when a Coriolis meter is used.

In an embodiment, the brine density system 10 operates through a computerized system, such as the controller 600 illustrated in FIG. 4. In such an embodiment, a brine density value may be transmitted to the controller 600 or other computerized system, through wires or wirelessly, from the brine density sensor 26. In that embodiment, a customer or other user may input one or more predetermined set points into the controller 600 or other computerized system to indicate a density level that person associates with heavy brine density or low brine density. A source of brine entering the brine density system 10, such as an identifier of a tanker truck 210 carrying brine in its tank 212 may also be entered into the controller 600 or other computerized system to indicate the source of the brine classified as low-density or high density. In addition, a quantity of unloaded brine or material, and other information related to the unloading of brine may be provided to the controller 600 or other computerized system and provided to an operator of that system.

When the brine density system 10 operates in certain embodiments, the blower 164 or another vacuum device may be energized to draw or speed delivery of brine into the system 10. The sensing branch valve 24 may be opened to allow brine to pass through the brine sensing branch 18 and the brine density sensor 26, for example, as unloading of brine begins. The brine may pass through the brine sensing branch 18 and past the brine density sensor 26 for a predetermined period of time, such as 10-30 seconds, to register the brine density to assure that the brine density sensor is sensing the density of brine from the unloading source, such as, for example, the tank 212 and not from a previously unloaded tank 212.

After the predetermined period has passed, the density of the brine from the current source (e.g., 212) may be sensed or determined, and a determination of whether to discharge the current load of brine into a standard use brine tank 50 or AST 52, or to a heavy brine tank 54 can be made. Once the determination of the density of brine in the current load, the controller 600 or other computerized system may open the brine flow valve 28 to permit full flow of brine into the heavy sediment settling tank 70 and on through the brine density system 10. One of the standard brine valve 80 and the heavy brine valve 82 will also be opened to direct the brine to the appropriate tank 50, 52, or 54.

The sensing branch valve 24 may be closed when, or around the time, the brine flow valve 28 is opened, or the sensing branch valve 24 may remain open while the brine flow valve 28 is opened for continued sensing of the brine density or for other sensing occurring in the brine sensing branch 18.

Upon the completion of a period of brine flow through the brine density system 10, when, for example, a tanker truck 210 has completed the unloading of its tank 212 into the brine density system 10, the blower 164 may de-energize and the various valves 24, 28, 80, 82, may close to isolate the brine density system 10 until more brine is present for processing through the brine density system 10.

Figure 2:
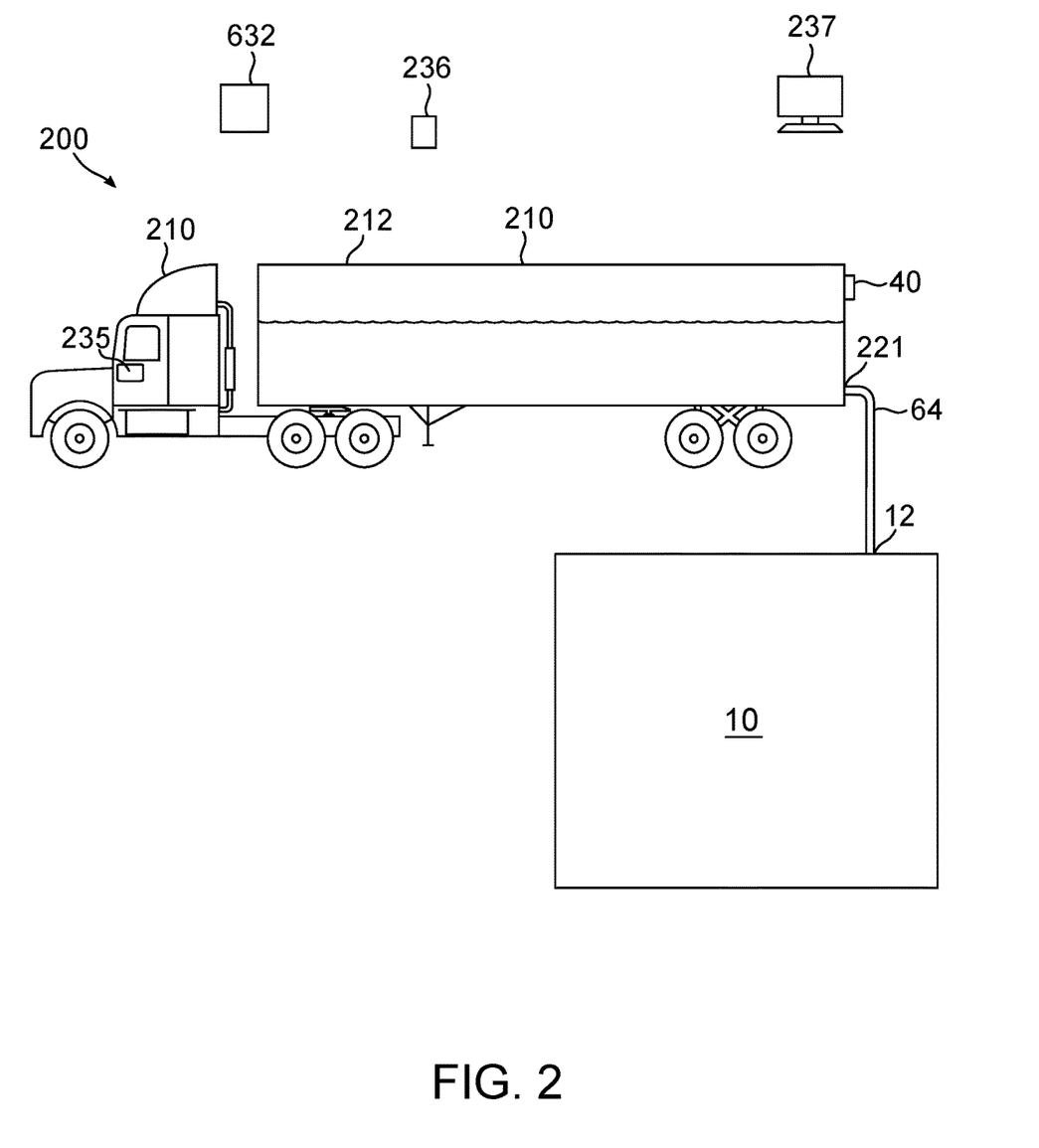
FIG. 2 illustrates an embodiment of a tanker truck unloading a tank of brine into the brine density system.

FIG. 2 illustrates an embodiment of an aqueous fluid transfer system 200 employing a brine density system 10 attached to a tanker truck 210 outlet 221 to sense the density of an aqueous fluid flowing from the tanker truck 210. In that embodiment, the aqueous mixture is hauled in the tank 212 of the tanker truck 210 to a drilling site or another site where the aqueous mixture is needed or to be stored. Transfer may begin with the connection of the transfer hose 64 extending from the outlet 221 of the truck tank 212 to the inlet 12 of the brine density system 10. The brine density system 10 may be coupled to the truck 210 tank 212 through a pipe or manifold arrangement, or otherwise as desired to enable transfer of brine to the brine density system 10.

The aqueous fluid transfer system 200 may further include a tanker truck controller 235, a remote monitoring peripheral computer 237, an electronic fob 236, and a user interface 632. Those devices 235, 236, 237, and 632 may be used to perform or assist in performing various monitoring or control functions.

In the embodiment illustrated in FIG. 2, the density of aqueous mixture brine transferred from the truck 210 tank 212 to the brine density system 10 is determined to fall into a certain category of brine density, such as heavy brine, light brine or another category of density, such as a mid-level density brine. The aqueous mixture is then directed to an appropriate location, such as, for example, the heavy brine tank 54 and if highly dense brine is sensed by the brine density system 10, or the AST 52 or a light brine tank 50 if low-density brine is sensed by the brine density system 10.

In addition, the brine density system 10 may provide an audible or visual signal 40 or otherwise notify an operator whether the density of the density of the aqueous mixture 48.

In an embodiment of the aqueous fluid transfer system 200 of FIG. 2, an operator pulls a truck 210 into the vicinity of a brine density system 10 and its associated light or standard brine and heavy brine aqueous mixture tanks 50, 52, 54. Information about the truck 210 is communicated to a site controller 37, either automatically, for example using the electronic fob 36 or upon initiation by the driver or an operator, for example using the user interface 632. An operator then connects the tank 212 of the tanker truck 210 to the brine density system 10 for transfer of aqueous mixture from the tank 212 to the brine density system 10 and the various tanks 50, 52, 54 beyond.

Figure 3:
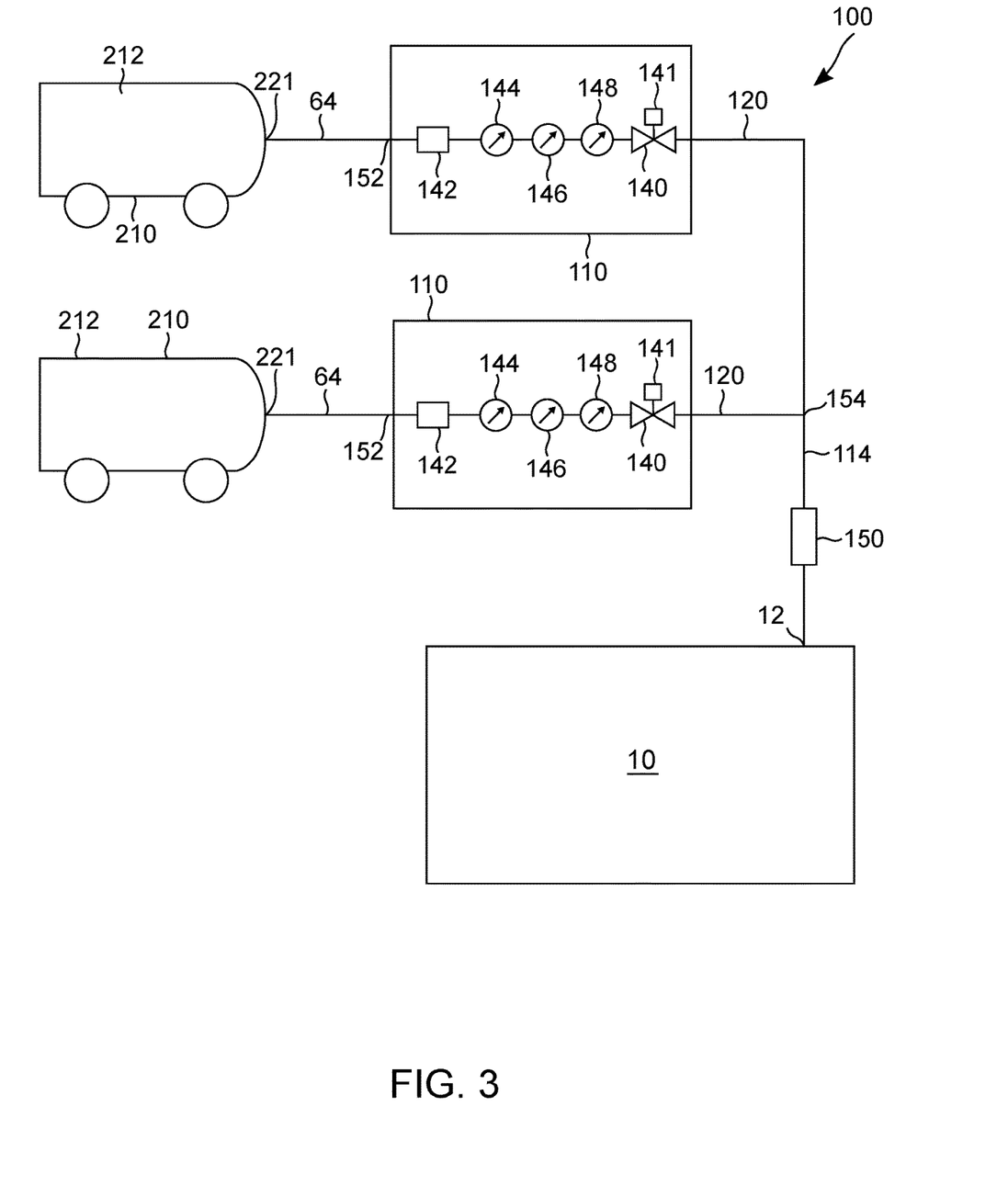
FIG. 3 illustrates an embodiment of a plurality of tanks unloading brine into a brine density system.

FIG. 3 illustrates an embodiment of a plurality of tanks 212 discharging brine into a brine density system 10 through a manifold pipeline fluid transfer system 100. In embodiments, the aqueous brine mixture flows, and in certain embodiments is propelled by vacuum, through the manifold pipeline fluid transfer system 100. In the embodiment illustrated in FIG. 3, one brine density system 10 of FIG. 1 receives brine flowing from a plurality of sources. In the embodiment illustrated, two unloading stations 110 are provided, though any number of unloading stations 110 desired may be included in a manifold pipeline fluid transfer system 100. A truck 210 tank 212 may be coupled to one or more unloading station 110, for example, by way of a separate transfer hose 64 for each truck 210 tank 212. Each unloading station 110 may include a variety of sensors, valves, gauges, and displays, such as an offloading valve 140, a sight tube 142, a pressure gauge or sensor 144, a flow gauge or sensor 146, a temperature gauge or sensor 148, or any other desired gauge or sensor. For the purpose of the embodiment illustrated in FIG. 3 gauges may provide a visual representation of a characteristic of the fluid in the offloading portion of a line 120 or pipe, and a sensor or sensors may each provide a signal that represents a fluid characteristic to a processor-based device, such as the controller 600 illustrated and discussed in connection with FIG. 4 or a control system or other computing device 236, 237, 632. Sensor signals may, furthermore, be transmitted through wires or wirelessly.

The manifold pipeline fluid transfer system 100 of this embodiment may be employed to expedite offloading of one or more tanker trucks 210 while directing various density brines, such as high-density brine and low-density brine, to different tanks 50, 52, 54. In the embodiment illustrated in FIG. 3, a plurality of tanker truck 210 offloading stations 110 are provided so that more than one tanker truck 210 can have aqueous brine fluid withdrawn from their associated tanks 212, offloading simultaneously into the manifold 120. For example, in an embodiment for offloading tanks of water-based brine fluids used in hydraulic fracturing, ten offloading stations 110 may be provided. A tanker truck 210 may pull up to and connect to the manifold pipeline fluid transfer system 100 through an offloading station 110 when that offloading station 110 is not occupied or otherwise used by another truck 210. An offloading station 110 can be used independent of other station occupancy, regardless of any use or maintenance occurring at the other offloading stations 110, and regardless of whether one or more trucks 210 are occupying one or more other stations 110 or are in the process of offloading. The tanker truck 210 that pulls into an offloading station can connect to an offloading inlet 152 portion of the line 120 at the offloading station 110 and offload the contents of its tank 212 through the offloading inlet 152 portion of the line 120 or pipe while other trucks 210 are simultaneously offloading their tanks 212.

In certain embodiments, each offloading station 110 includes a flexible transfer hose for hook-up to inlet 152 of that offloading station 110 through which fluid from the tank 212 of the truck 210 can flow into a manifold 114 and from there, directly or indirectly, into a site tank 50, 52, 54 through the brine density system 10 and any tanks included in the brine density system 10, such as heavy sediment settling tank 70 or intermediate tank 162. The manifold 114 may be in fluid communication with each offloading station 110 and the tanks, including heavy sediment settling tank 70, intermediate tank 162, standard use brine tank 50, aboveground storage tank (AST) 52, or heavy brine tank 54. The manifold 114 may be a piping system that accepts fluid from each offloading station 110, combines fluid received from the offloading stations 110 at one or more junctions 154, and deposits the fluid received from the offloading stations 110 into the appropriate tank 70, 162, 50, 52, 54.

The manifold pipeline fluid transfer system 100 may be configured in various ways that are suited to an offloading site. The manifold pipeline fluid transfer system 100 illustrated in FIG. 3 includes a plurality of lines 20 that lead from offloading stations 110 into a manifold 114 branch extending from each offloading station 110. The plurality of lines 20 extending from the offloading stations join at one or more junctions 154 to form a common manifold 114 that extends to the brine density system 10, as illustrated in FIG. 3.

A flow sensor or meter 150 or another flow measuring device may be placed in the manifold 114 common line to measure the total flow through the manifold 114. That flow measurement may be used to determine total flow into the manifold 114 and may be used to control flow into the manifold 114, for example, through the offloading valves 140. Alternatively, a flow switch may be placed in the manifold 114 common line to indicate fluid is flowing through the manifold 114. Either the flow meter 150 or switch may be coupled to a computerized monitoring or control system including the processor-based control device 600 illustrated and discussed in connection with FIG. 5.

The offloading valves 140 may be located in some or all of the offloading stations 110 to control flow from the offloading stations 110 or to isolate one or more offloading stations 110. The offloading valves 140 may be a variety of types of valves, including a ball valve, a gate valve, or a globe valve. The offloading valve 140 may furthermore be actuated manually, may be automatically controlled for full opening or closure, or may be modulated for regulated flow by a manifold control system, such as the controller 600 illustrated in FIG. 5. The offloading valve 140 may be of a size that permits full flow of fluid from the truck 210 tank 212, such as a 4" valve with a full flow characteristic. The full flow characteristic of a ball valve, for example, may be beneficial to enable fast offloading of tanks 212 coupled thereto. Alternatively, the offloading valve 140 may be configured with a linear control characteristic, such as that provided by a globe valve, or may have another desired flow characteristic. The offloading valve may furthermore be used to permit flow through the offloading station 110 when open and to prevent flow into the offloading station 10 when closed.

Other valves (e.g., 24, 28, 80, 82) may also be of various types and may be provided with manual or automatically controlled actuators that may be controlled using a computerized monitoring or control system, such as the processor-based control device 600 illustrated and discussed in connection with FIG. 5. Control of the offloading valve 140 and other components of the manifold system 100 may also be performed using a computer, such as the processor-based controller 600 illustrated and discussed herein in connection with FIG. 5.

Fluid unloaded from a tanker truck 210 is known to sometimes encounter gas, particularly air, mixing with the fluid. Thus, an air removal system 160 may be provided in the manifold system 100, for example, in the manifold 114 prior to the brine entering the brine density system 10.

In an embodiment in which an offloading valve 140 is included in the unloading station 110, the offloading valve 140 may be opened after the transfer hose 64 is attached to the unloading station 110. The processor-based controller 600 illustrated and discussed herein in connection with FIG. 5 may be coupled to an actuator 141 on the offloading valve 140 and the actuator 141 may close the offloading valve 140 when, for example, the density of brine to be offloaded from a tanker 210 tank 212 is heavy density brine and the brine density system 10 needs to be redirected from a low-density brine tank 50, 52 to a high-density brine tank 54.

It may be seen that in a manifold pipeline fluid transfer system 100 having multiple stations, while not necessary, it may be beneficial to have a separate brine density sensor 26 and offloading valve 140 at each station so that when brine having an unexpected density is sensed at one station, brine flow through that station 110 may be stopped while trucks 210 may continue to offload brine aqueous mixture at the remaining stations 110.

In operation, the sensor or sensors (e.g., 26) of a brine density system 10 may be installed in a line, such as a pipe carrying the fluid for which a density determination is desired. Installation of the sensors may be by insertion of the sensors (e.g., 26) into the line 20 and affixing the sensors (e.g., 26) in the line 20. A pump 22 may propel the fluid through the line 20 and manifold 114, or the fluid may flow by way of gravity or other means. A flow sensor 150 may also be included in the line 20 or manifold 114 and a pressure sensor 144 or other sensors may also or alternatively be included in the line 20 or manifold 114.

Flow shut-off devices may be included in the line 20 or manifold 114, including a pump shutoff control and one or more valves, which may be used to isolate a section of the line 20 or manifold 114 into which one or more of the sensors (e.g., 26) are inserted.

The brine density system 10 may be housed in a Class1/Div2 or Class1/Div1 enclosure for deployment in hazardous areas or another desired enclosure, and the brine density system 10 may be outfitted with a self-cleaning function tailored to the brine, water, or aqueous fluid stream to ensure that it does not lose detection ability due, for example, to plating or fouling. The brine density system 10 may be powered by a nominal 110 VAC power supply or another desired electrical power supply.

The brine density system 10 may also include a sensor cleaning system to remove hydrocarbons, solid impurities, or other foreign materials from the sensors (e.g., 26). In an embodiment, that cleaning system may draw 1 HP of power and create 7 CFM of airflow across the sensors (e.g., 26) at 90 psi per hour.

In certain embodiments, the brine density system 10 may include cellular or satellite connectivity so that the brine density system 10 can be accessed from anywhere in the world allowing for visibility into condensate concentrations and alarm conditions.

Regarding identification provided when a tanker truck 210 approaches a site, such as an offloading site or an onloading site, the truck 210 or tank 212 may be identified by any unique identifier. For example, a user interface may be used to identify the tank 212 currently in position for operation (e.g., load or unload) by way of a wired or wireless transmission from an electronic device associated with the tank 212. A unique identifier may be transmitted from the tank 212 or associated truck 210 by any signal transmitting device, or an identifier may be read and transmitted by a geofencing or other position determination device that senses the presence of the tank 212 or its associated truck 210. Alternatively, a driver or operator may enter the tank identifier into a device to recognize a tank 212 that is currently under operation.

In an embodiment, a tanker truck driver will carry an electronic fob 36 or other device that contains a name or an identification of the driver, the company that operates the truck 210, a truck 210 identifying number, or any other tanker truck 210 related information desired, such as a quantity of brine aqueous mixture carried by the truck tank 212 or a capacity of the tank 212, and transmits that identification to an appropriate communicating node at, or remote from, the site.

In one embodiment, a brine density system 10 for an aqueous mixture, includes a processor-based controller 600 having an input and a plurality of outputs. In that brine density system 10 a brine density sensor 26 is coupled to a first input of the controller, the brine density sensor sensing an amount of non-aqueous constituent components within the aqueous mixture and providing a signal to the controller commensurate with that amount of non-aqueous constituent components within in the aqueous mixture. A standard brine valve 80 is installed in a standard brine line 40 that leads to a standard brine tank 50. That standard brine valve 80 has an actuator 81 controlled from a first output of the controller 600 such that the standard brine valve 80 is open when the brine density sensor 26 senses brine having a density less than a first predetermined level and the standard brine valve 80 is closed when the brine density sensor 26 senses brine having a density greater than a second predetermined level. A heavy brine valve 82 in a heavy brine line 46 that leads to a heavy brine tank 54, the heavy brine valve 82 having an actuator 83 controlled from a second output of the controller 600 such that the heavy brine valve 82 is open when the brine density sensor 26 senses brine having a density greater than the second predetermined level and the heavy brine valve 82 is closed when the brine density sensor senses brine having a density less than the first predetermined level.

In certain embodiments, the brine density system 10 includes a first diverting wye 14. The first diverting wye includes a first diverting wye inlet in fluid communication with a system inlet of the brine density system, a first outlet coupled to a brine sensing branch, the brine density sensor disposed one of in, on, and through the brine sensing branch, and a second outlet coupled to a sediment deposition branch. In such an embodiment, the system inlet 12 may be configured to be coupled to a transfer hose 64.

Certain embodiments also include a brine density diverting wye 36. In such embodiments, the brine density diverting wye 36. The brine density diverting wye 36 may include an inlet in fluid communication with the outlet of the mixing wye, a first outlet in fluid communication with a standard brine tank, and a second outlet in fluid communication with a heavy brine tank. That brine density diverting wye 36 along with standard brine valve 80 and heavy brine valve 82 may alternatively be replaced with a three-way valve. In addition, the brine density system 10 may include a three-way mixing valve where mixing wye 34 is shown in FIG. 1 to switch or modulate brine flow through the brine sensing branch 18 and the sediment deposition branch 22 and that three-way mixing valve may include an actuator for automatically or manually opening and closing the three-way mixing valve.

Embodiments may also include a brine sensing valve 28 controlled by a brine sensing valve actuator 29 disposed in the brine sensing branch 18 and have a brine sensor 26 disposed in the brine sensing branch 18. The brine sensing valve 28 may be a three-way valve and that brine sensing valve 28 may meter brine flow through the brine sensing branch and meters brine flow through the sediment deposition branch.

Embodiments of the brine density system 10 may also include a heavy sediment settling tank 70. That heavy sediment settling tank 70 may be in fluid communication with the sediment deposition branch. Embodiments may also include a brine flow valve disposed in the sediment deposition branch and a mixing wye in fluid communication with an outlet of the heavy sediment settling tank at a first inlet and connected to the brine sensing branch at a second inlet. A mixing wye may also be included that has a first inlet in fluid communication with an outlet of the sediment deposition tank and a second inlet in fluid communication with an outlet of the brine sensing branch.

In embodiments of the brine density system 10 a standard brine pipe is coupled to the first outlet of the brine density diverting wye, the standard brine pipe having a standard brine valve that permits brine flow therethrough when open and prevents brine flow therethrough when closed and a heavy brine pipe coupled to the second outlet of the brine density diverting wye, the heavy brine pipe having a heavy brine valve that permits brine flow therethrough when open and prevents brine flow therethrough when closed. In such embodiments, the heavy brine valve may be closed to prevent brine flowing into the heavy brine tank and the standard brine valve is open to permit brine to flow through the standard brine pipe and into the standard brine tank when the brine density sensor indicates that the brine is of a standard density and the standard brine valve is closed to prevent brine flowing into the standard brine tank and the heavy brine valve is open to permit brine to flow through the heavy brine pipe and into the heavy brine tank when the brine density sensor indicates that the brine is of a heavy density.

In another embodiment, a brine density system includes an inlet coupled to a conduit to receive brine flow from a tanker truck tank and adapted to be coupled to a first end of a tanker truck transfer hose, a brine density sensor in a brine density system conduit. In that embodiment, the brine density sensor senses a measurable physical characteristic that indicates an amount of non-aqueous constituent components within a volume of process water. That embodiment further includes at least one valve in the brine density system conduit that directs brine flowing through the brine density system to either a standard brine tank or a heavy brine tank. The brine is directed to the standard brine tank if the sensed physical characteristic indicates the brine flowing from the tanker truck tank is below a predetermined level and the brine is directed to the heavy brine tank if the sensed physical characteristic indicates the brine flowing from the tanker truck tank is above the predetermined level.

FIG. 4 illustrates an embodiment of a processor-based controller 600 for use in a brine density system 10. The processor-based controller 600 may, for example, be a microcontroller, an application specific integrated circuit, a general-purpose computer, or a programmable logic controller, such as those manufactured by Rockwell International under the Allen Bradley trademark. In the embodiment illustrated in FIG. 4, the processor-based device 600 includes a processor 602 and a communication device 612. The processor 602 and communication device 612 can be combined in a microprocessor or other device and other components (e.g., 604 and 606) may also be included in such a microprocessor or other device.

The communication device 612 may be wired to a device to which it communicates. The communication device 612 may, in addition or alternatively, wirelessly communicate with one or more other devices over a network 240, which may be a wireless network, such as a mobile smartphone network, a short-range wireless protocol, such as Bluetooth or Zigbee, or another desired communication protocol, and the communication device 612 may operate both wired and wirelessly. The processor-based device 600 may furthermore include memory 604, an input 610 that may receive an input signal, such as a signal transmitted by a sensor, and an output 608 that may transmit a control signal, instruction, or data to another device, such as a valve actuator or other controlled device. The output device may alternatively or in addition provide a reading, for example a current density of brine or aqueous mixture passing by the brine density sensor 26 or passing through the brine density system 10.

The processor-based device 600 may also be coupled to a user interface 632 to receive one or more signals from, for example, one or more of a keyboard, touch screen, mouse, microphone or other input device or technology and may have associated software. The user interface 632 may also transmit information to, for example, a printer or screen coupled to the user interface 632 or the output 608.

The memory 604 may, for example, include random-access memory (RAM), flash RAM, dynamic RAM, or read only memory (ROM) (e.g., programmable ROM, erasable programmable ROM, or electronically erasable programmable ROM) and may store computer program instructions and information. In embodiments, the memory 604 may be partitioned into sections including an operating system partition 616 where system operating instructions are stored, a data partition 618 in which data, such as total hydrocarbon passage and total aqueous mixture passage may be stored, and a signal modification module 620 that may be used to convert sensor signals into human readable engineering units.

The storage device 606 may include a memory device or a data storage device or a combination of both memory and data storage devices, or another device or devices for storage of data. The data storage 606 may be considered local storage when the data is stored directly on the processor-based device 600 or the data may be accessible to the processor-based device 606 over a wired or a wireless network. The storage device 606 may furthermore include a computer readable storage medium that includes code executable by the processor 602, which may be used, for example, to cause the processor 602 to, at least in part, perform hydrocarbon detection as disclosed herein.

In an embodiment, the storage device 606 for the processor-based device 600 may include a combination of flash storage and RAM. The storage device 606 may also include a computer readable storage medium and may include code executable by the processor 602.

In an embodiment, the elements, including the processor 602, communication adaptor 612, memory 604, input device 610, output device 608, and data storage device 606 may communicate by way of one or more communication busses 614. Those busses 614 may include, for example, a system bus or a peripheral component interface bus.

The processor 602 may be any desired processor and may be a part of a controller 600 or a microcontroller, may be part of or incorporated into another device, or may be a separate device. The processor 602 may, for example, be an Intel® manufactured processor or another processor manufactured by, for example, AMD®, DEC®, or Oracle®. The processor 602 may furthermore execute the program instructions and process the data stored in the memory 604. In one embodiment, the instructions are stored in the memory 604 in a compressed or encrypted format. As used herein the phrase, "executed by a processor," is intended to encompass instructions stored in a compressed or encrypted format, as well as instructions that may be compiled or installed by an installer before being executed by the processor 602.

The data storage device 606 may be, for example, non-volatile battery backed static random-access memory (RAM), a magnetic disk (e.g., hard drive), optical disk (e.g., CD-ROM) or any other device or signal that can store digital information. The data storage device 606 may furthermore have an associated real-time clock, which may be associated with the data storage device 606 directly or through the processor 602. The real-time clock may trigger data from the data storage device 606 to be sent to the processor 602, for example, when the processor 602 polls the data storage device 606. Data from the data storage device 606 that is to be sent across the network 622 through the processor 602 may be sent in the form of messages in packets if desired. Those messages may furthermore be queued in or by the processor 602.

The communication adaptor 612 permits communication between the processor-based device 600 and other nodes, such as a tanker truck controller 35 or a remote monitoring peripheral computer 37, both illustrated in FIGS. 2 and 3, or another computing device or server. The communication adaptor 612 may be a network interface that transfers information from a node such as a networked device, which would include an actuating device such as valve 60 or a sensing device 12,14,16, to the tanker truck controller 35, the remote monitoring peripheral computer 37, a general-purpose computer (not illustrated), a user interface 632, or another node. The communication adaptor 612 may be an Ethernet adaptor or another adaptor for another type of network communication. It will be recognized that the processor-based device 600 may alternatively or in addition be coupled directly to one or more other devices through one or more input/output adaptors (not shown).

The processor-based control device 600 may communicate and may have its memory 604 or processes modified by a user interface 632. That user interface 632 may be, for example, a computer; a tablet; a mobile smartphone device (referred to herein as a phone); an application specific user interface device; or another device that can be used to transfer information to the controller 600 or receive information from the controller 600.

Figure 5:
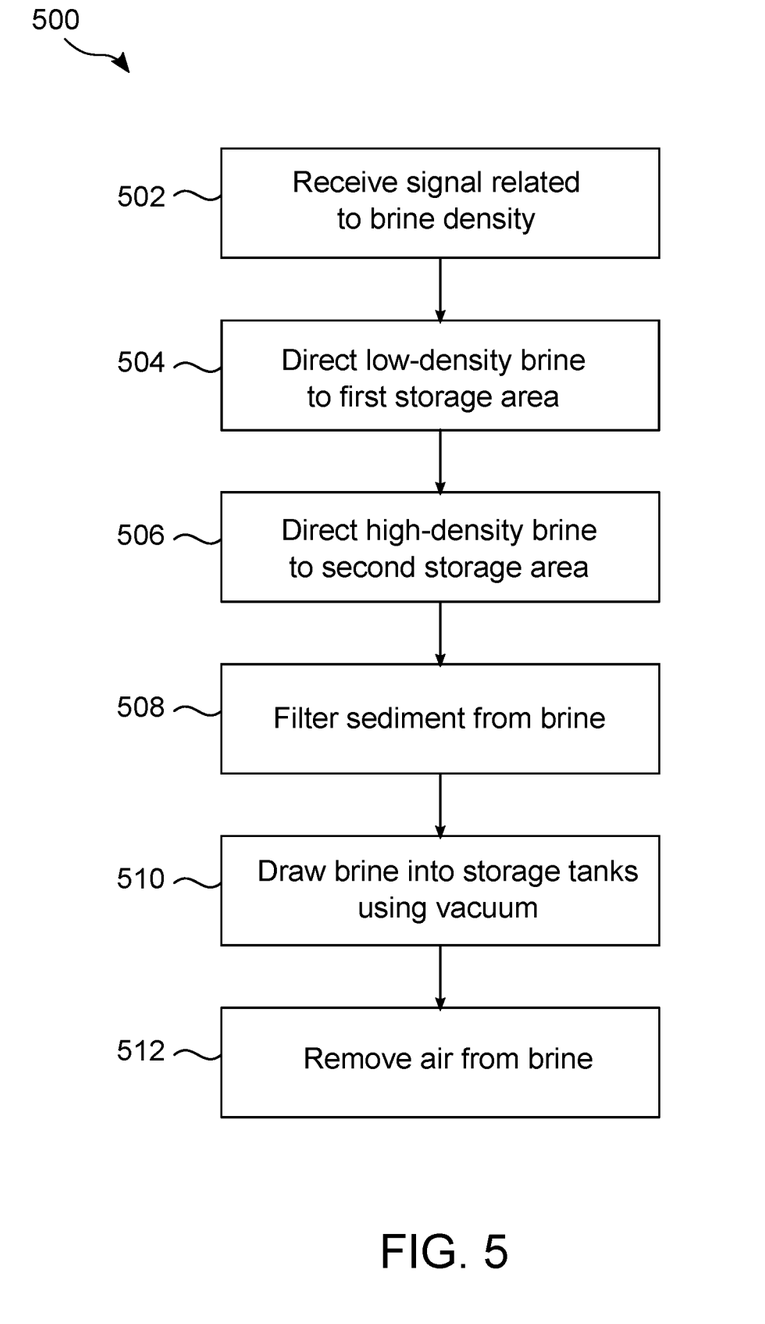
FIG. 5 illustrates an embodiment of a method of selecting an appropriate location for brine based on the density of the brine.

FIG. 5 illustrates a method of separating brines to be used in different hydraulic fracturing tasks 500. At 502, a controller 600 receives a signal related to the density of non-aqueous constituent components in an aqueous mixture for use on a hydraulic fracturing site fluorometer. At 504, the controller 600 directs low density aqueous mixture for use in hydraulic fracturing to a first storage area. At 506, the controller 600 directs high density aqueous mixture for use in tasks other than hydraulic fracturing, including well closing and well winterizing, to a second storage area.

In one embodiment, the controller will provide a signal or alarm to a user when brine is sensed to have a density lower than requested. For example, a brine invoice may be scanned or entered by a user unto the processor-based controller 600 and the density of the brine being unloaded may be determined by the brine density system 10. If the brine being unloaded is less dense than the brine that was ordered, the processor-based controller 600 may provide a message or alarm that the shipment should be rejected or delivered to the standard use brine tank 50 or the above-ground storage tank (AST) 52 and not delivered to the heavy brine tank 54.

The method of separating brines to be used in different hydraulic fracturing tasks 500 may also periodically use the controller 600 to measure sediment filtered from the brine at 508, draw brine into the storage tanks using vacuum at 510, and remove air from the brine with an air removal system at 512. The method of separating brines may also use the controller 600 to control at least one valve that directs the brine to the storage tanks.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A brine density system for an aqueous mixture, comprising:
a processor-based controller having an input and a plurality of outputs;
a brine density sensor coupled to a first input of the controller, the brine density sensor sensing an amount of non-aqueous constituent components within the aqueous mixture and providing a signal to the controller commensurate with that amount of non-aqueous constituent components within in the aqueous mixture;
a standard brine valve in a standard brine line that leads to a standard brine tank, the standard brine valve having an actuator controlled from a first output of the controller such that the standard brine valve is open when the brine density sensor senses brine having a density less than a first predetermined level and the standard brine valve is closed when the brine density sensor senses brine having a density greater than a second predetermined level; and
a heavy brine valve in a heavy brine line that leads to a heavy brine tank, the heavy brine valve having an actuator controlled from one of the first output and a second output of the controller such that the heavy brine valve is open when the brine density sensor senses brine having a density greater than the second predetermined level and the heavy brine valve is closed when the brine density sensor senses brine having a density less than the first predetermined level.

2. The brine density system of claim 1, further comprising a first diverting wye having:
a first diverting wye inlet in fluid communication with a system inlet of the brine density system;
a first outlet coupled to a brine sensing branch, the brine density sensor disposed one of in, on, and through the brine sensing branch; and
a second outlet coupled to a sediment deposition branch.

3. The brine density system of claim 2, wherein the system inlet is configured to be coupled to a transfer hose.

4. The brine density system of claim 2, further comprising:
a brine sensing valve disposed in the brine sensing branch; and
wherein the brine density sensor is disposed in the brine sensing branch.

5. The brine density system of claim 4, wherein the brine sensing valve is a three-way valve that meters brine flow through the brine sensing branch and meters brine flow through the sediment deposition branch.

6. The brine density system of claim 2, further comprising a heavy sediment settling tank in fluid communication with the sediment deposition branch.

7. The brine density system of claim 6, further comprising:
a brine flow valve disposed in the sediment deposition branch; and
a mixing wye in fluid communication with an outlet of the heavy sediment settling tank at a first inlet and connected to the brine sensing branch at a second inlet.

8. The brine density system of claim 2, further comprising a mixing wye, the mixing wye having a first inlet in fluid communication with an outlet of the sediment deposition tank and a second inlet in fluid communication with an outlet of the brine sensing branch.

9. The brine density system of claim 8, further comprising a brine density diverting wye, the brine density diverting wye having:
    an inlet in fluid communication with the outlet of the mixing wye;
    a first outlet in fluid communication with the standard brine tank; and
    a second outlet in fluid communication with the heavy brine tank.

10. The brine density system of claim 9, further comprising:
    a brine density diverting three-way valve, the brine density diverting three-way valve having:
        an inlet in fluid communication with the outlet of the mixing wye;
        a first outlet in fluid communication with the standard brine tank; and
        a second outlet in fluid communication with the heavy brine tank.

11. The brine density system of claim 10, further comprising:
    a standard brine pipe coupled to the first outlet of the brine density diverting wye, wherein the standard brine valve permits brine flow through the standard brine pipe when open and prevents brine flow through the standard brine pipe when closed; and
    a heavy brine pipe coupled to the second outlet of the brine density diverting wye, wherein the heavy brine valve permits brine flow through the heavy brine pipe when open and prevents brine flow through the heavy brine pipe when closed.

12. The brine density system of claim 11, wherein:
    the heavy brine valve is closed to prevent brine flowing into the heavy brine tank and the standard brine valve is open to permit brine to flow through the standard brine pipe and into the standard brine tank when the brine density sensor indicates that the brine is of a standard density; and
    the standard brine valve is closed to prevent brine flowing into the standard brine tank and the heavy brine valve is open to permit brine to flow through the heavy brine pipe and into the heavy brine tank when the brine density sensor indicates that the brine is of a heavy density.

13. The brine density system of claim 1, further comprising an air removal system.

14. The brine density system of claim 1, further comprising a filter disposed to receive heavy sediment contained in the brine before the brine enters one of the standard brine tank and the heavy brine tank.

15. The brine density system of claim 14, further comprising a debris measuring device that measures debris disposed in the filter.

16. The brine density system of claim 1, wherein the standard brine valve and the heavy brine valve are incorporated into a single three-way valve.

17. A brine density system, comprising:
    an inlet coupled to a conduit to receive brine flow from a tanker truck tank and adapted to be coupled to a first end of a tanker truck transfer hose;
    a brine density sensor in a brine density system conduit, the brine density sensor sensing a measurable physical characteristic that indicates an amount of non-aqueous constituent components within a volume of process water; and
    at least one valve in the brine density system conduit, the at least one valve to direct brine flowing through the brine density system to:
        a standard brine tank if the sensed physical characteristic indicates the brine flowing from the tanker truck tank is below a predetermined level; and
        a heavy brine tank if the sensed physical characteristic indicates the brine flowing from the tanker truck tank is above the predetermined level.

18. The brine density system of claim 17, wherein the predetermined level includes a hysteresis and further comprising:
    a heavy sediment settlement tank in fluid communication with the brine density system conduit and through which the brine flows before entering either the standard brine tank or the heavy brine tank; and
    an air removal system in fluid communication with the brine density system conduit.

19. A method of separating brines to be used in different hydraulic fracturing tasks, comprising:
    sensing the density of non-aqueous constituent components in an aqueous mixture for use on a hydraulic fracturing site;
    directing low density aqueous mixture for use in hydraulic fracturing to a first storage area; and
    directing high density aqueous mixture for use in tasks other than hydraulic fracturing, including well closing and well winterizing, to a second storage area.

20. The method of claim 19, further comprising:
    filtering sediment from the aqueous mixture;
    measuring sediment filtered periodically;
    drawing brine into the first storage area using vacuum;
    removing air from the brine; and
    controlling at least one valve that directs the brine to the first storage area using a processor-based controller.

* * * * *